July 24, 1934. J. L. COYLE Re. 19,250

EGG BOX

Original Filed June 29, 1918 2 Sheets-Sheet 1

INVENTOR
Joseph Leopold Coyle.
By
Atty.

EGG BOX
Original Filed June 29, 1918 2 Sheets-Sheet 2
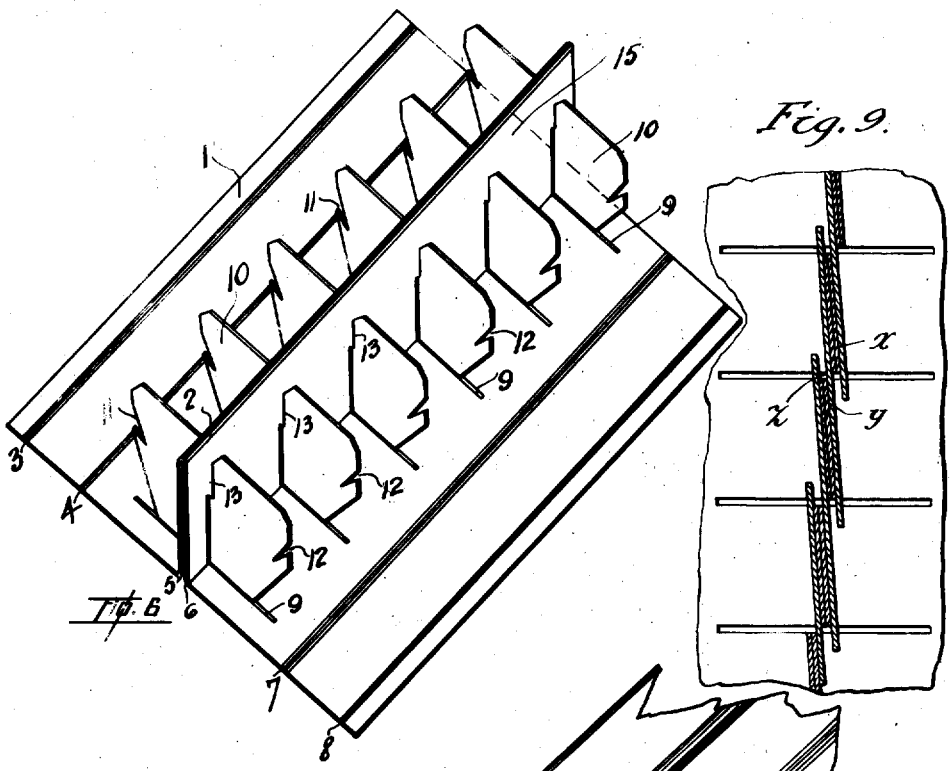
Fig. 6
Fig. 9.
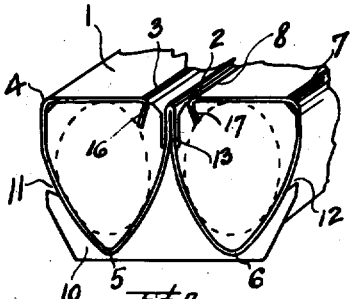
Fig. 8
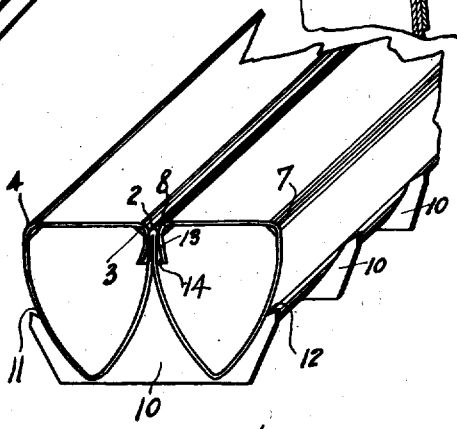
Fig. 7
INVENTOR
Joseph Leopold Coyle.
By [illegible]
Attys.

Reissued July 24, 1934

Re. 19,250

UNITED STATES PATENT OFFICE 19,250

EGG BOX

Joseph Leopold Coyle, London, Ontario, Canada, assignor, by direct and mesne assignments, to Coyle Safety Carton Co., Chicago, Ill., a corporation of Delaware Original No. 1,327,946, dated January 13, 1920, Serial No. 340,798, June 29, 1918. Application for reissue June 8, 1934, Serial No. 729,702

9 Claims. (Cl. 229—29)

My invention relates to improvements in egg boxes, and the object of my invention is to provide a simple, inexpensive and safe receptacle for the carrying and handling of eggs in which the eggs are suspended and supported clear of each other so that the breakage is reduced to the minimum and the construction of which is such that the removal of the eggs is accomplished with great facility. A further object is to devise an egg box capable of being assembled from its knock-down form into receptacle form very quickly and with great convenience and which is very cheap to manufacture.

I attain these objects by the construction illustrated in the accompanying drawings, in which,—

Fig. 6 is a perspective view showing the walls in upright position and the blank unfolded;

Fig. 7 is a fragmentary perspective view of the box;

Fig. 8 is a fragmentary perspective view illustrating the alternative engagement of the ends of the blank; and Fig. 9 is a sectional plan view taken longitudinally along the center fold of the main body, but with the partition 10 in folded position instead of in extended position as shown in said Fig. 6.

Similar figures of reference indicate similar parts throughout the several views.

The egg box is formed preferably of cardboard or the like and may be made in sizes suitable to the requirements of trade, and while this description applies to the use of the device for the carrying of eggs it may be here stated that it can be used with equal facility and convenience for transporting other kinds of merchandise, such as glass bottles and other commodities of a fragile nature.

Figure 2:
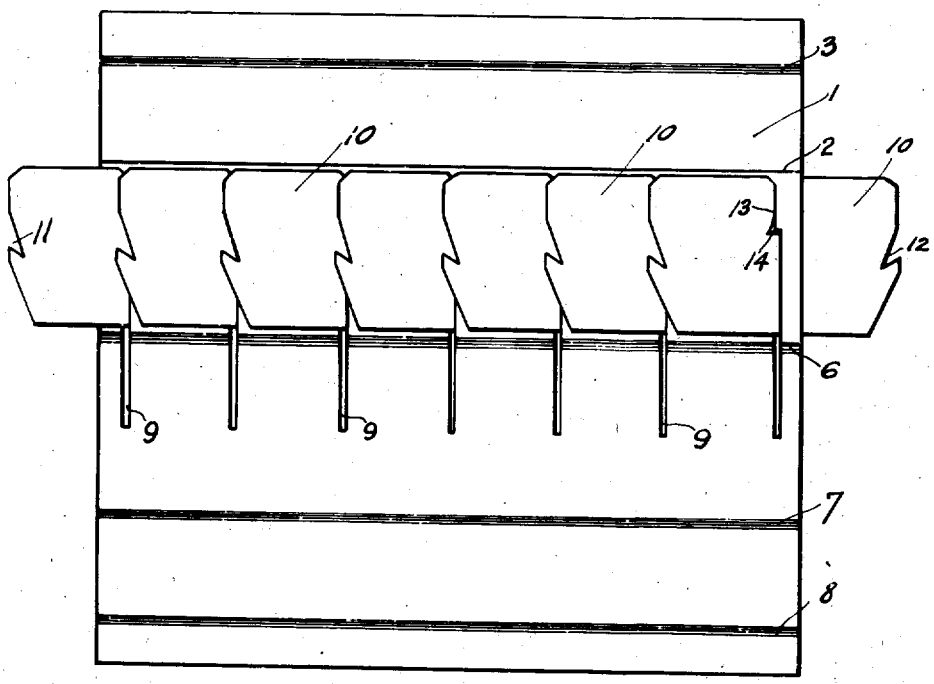
Fig. 2 is a plan view of the device unfolded.
Figure 3:
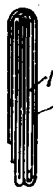
Fig. 3 is an end view of Fig. 1.
Figure 4:
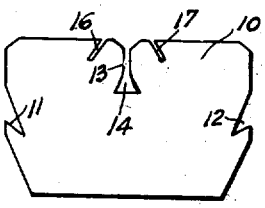
Fig. 4 is a detail view of a wall.
Figure 5:
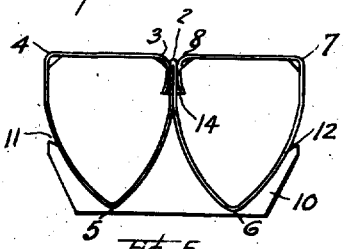
Fig. 5 is an end view of the assembled device.

The device consists of a blank 1 which is doubled over along its longitudinal center line as at 2 in Fig. 2, and is also creased at 3, 4, 5, 6, 7 and 8 as shown in Figs. 2 and 6, so that it may be readily folded or bent at these points when being assembled into receptacle form or when folded in the knock-down form shown in Fig. 3. 9 indicates slots cut in the blank, and in these slots are disposed walls 10 having formed in their opposite sides notches 11 and 12 and in the upper edge a slot 13 flared out at its lower end as indicated at 14 in Fig. 4, although this slot may be parallel sided if deemed preferable, as shown in Fig. 8. The flaring out of the slot, however, provides for better retention in place of the covers when the box is assembled, the cover ends following the flare of the slot, as shown in Fig. 5, when inserted therein.

Figure 1:
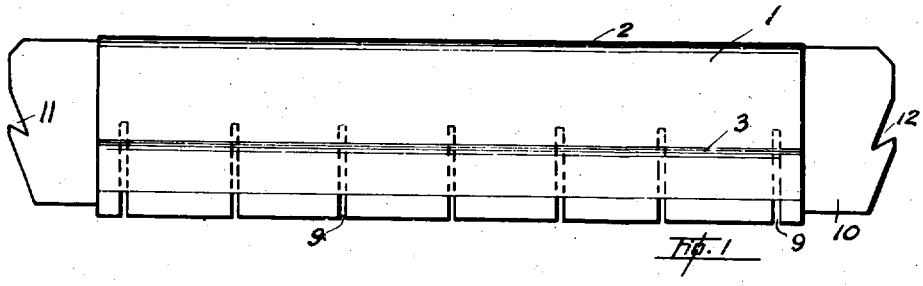
Figure 1 is a view of the device in knock-down form.

When assembling the device into its knock-down form, the walls 10 are inserted for substantially half their length into the slots 9, the blank 1 having first of all been doubled over at 2, and being then opened out flat with the doubled-over portion lying thereon and the walls positioned in the slots 9 lying flat on the blank and overlapping one another, as shown in Fig. 1. Both ends of the blanks are then brought together so that the walls are inclosed, and the sides thus formed are folded one on the other at the creases 4 and 7, so that the device has the appearance shown in Fig. 3 when viewed from the end.

To now assemble the device as an egg box or other merchandise carrier, the ends of the blank are raised and gripped one in each hand and an outward pull exerted on both tending to flatten out the blank again, by which act the walls 10 are automatically erected into a vertical position, as shown in Fig. 6. Each side of the blank is then raised and seated in the notches 11 and 12 respectively, thus forming a series of transverse compartments divided into rows of carrying compartments by the longitudinal wall 15 formed by the doubling of the blank at 2, as already mentioned, these latter compartments forming those in which the eggs are contained and into which they may now be placed, after which the sides of the blank are folded down on to the top edges of the walls to form covers for the compartments and the ends turned down and inserted in the slot 13, or, should it be desired to provide a cushion for the eggs, the ends of the cover are inserted into inclined slots 16 and 17, shown in Figs. 4 and 8, so that the eggs on one of their sides rest on the edges of the cover ends as shown in Fig. 8, the eggs being indicated by the dotted lines.

To remove the eggs, all that is necessasry is to raise one or both of the covers out of the slot 13 and the sides out of the notches 11 or 12 and flatten out the blank on either side, as desired, of the wall 15, when the eggs will roll out of the compartments without the necessity of lifting them out.

It will be seen, therefore, that I have devised a carrier for eggs and other merchandise which is simple and inexpensive in construction and operation and of great convenience and utility to those engaged in the transportation of fragile articles.

One distinguishing characteristic of my device is that the partitions 10 are not permanently connected with the sides of the main body, so that they may be folded into the position shown in Fig. 9 without bending. They lay substantially flat against the sides of the upstanding folded center of the main body, which folded or doubled center portion is indicated generally at 15. The ends of the partitions are entirely free from permanent connection with the sides of the body, and being held at their center portions by the slotted construction of themselves and the main body, they are freely removable and thus the compartments are adjustable as to size for holding different sizes of articles. In other words, by removing alternate partitions, the carrier may receive apples, pears, oranges, or other articles larger than eggs.

The doubled center portion of the main body at 15, together with the partitions free from permanent connection with the body at their ends, enables the partitions 10 to be located automatically in the position shown in Fig. 6 from their folded position shown in Figs. 2 and 9 by simply unfolding the sides of the main body part from the condition shown in Figs. 1 and 3 to that shown in Fig. 6, and by then exerting sufficient pull to slightly separate the members or sides of the center fold 15. By referring to Fig. 9 it is obvious that if the two layers $x$—$y$ of the center fold are very slightly separated, the partitions 10 will be caused to pivot or swing from their folded positions to the positions shown in Fig. 6, this action taking place entirely automatically by one wall $x$ pressing the partition one way on one side of its pivot point, or in other words on one side of the point where it passes through the slot at $z$ in said walls $x$ and $y$ while the other wall $y$ will press the partition, on the other side of said slot or pivot point, in the opposite direction, and thus the partition will be swung from the position of Figs. 2 and 9 to that of Fig. 6.

In effect, therefore, the partitions are pivotally mounted at a point intermediate of their length to the body blank or member. They fold substantially parallel with the adjacent faces of the blank when folded.

In removing any one of the partitions, it is simply moved down through the slot 9 in the main body, the notch 13 permitting this to be done.

It will be observed from Fig. 1 that the box when folded is in the form of a strip no wider than the height of the partitions, plus the thickness of the material of which the body is composed, hits body as it were being folded or wrapped around the doubled center 15 with its folded and overlapping partitions. There are no protuberances extending laterally of the folded strip like form of the container.

The partitions as shown in Figs. 5, 7 and 8 form a base for the body member to rest on, and as they project both below and at each side of the body they serve as protectors for the body member and its contents, being in the nature of projecting fins or webs, receiving any side blows or pressures to which the box may be subjected.

What I claim as my invention is:

1. An egg box comprising a foldable blank adapted when distended to afford a trough-like box body and partitions individually removably mounted on the body blank and adapted when the walls of the body blank are folded together to lie longitudinally with respect to said walls and adapted to be automatically unfolded into transverse relation to the body walls as the body is distended, substantially as described.

2. An egg box comprising a foldable body member having an upstanding folded center portion and side extensions adapted when the body member is distended to afford trough-like body sections on each side of the center portion, partitions pivotally mounted intermediate of their length on the upstanding center portion of the body and adapted to be folded substantially parallel therewith and between the same and the extensions when the body portion is collapsed, said partitions assuming positions at right angles to their collapsed relation when the body member is distended, the partitions and the body walls being inter-engaged when the body member and partitions are unfolded to maintain the body walls against internal and external displacement, substantially as described.

3. An egg box comprising a foldable body member having an upstanding folded center portion and side extensions adapted when the body member is distended to afford trough-like body sections on each side of the center portion, partitions pivotally mounted intermediate of their length on the upstanding center portion of the body and adapted to be folded substantially parallel therewith and between the same and the extensions when the body portion is collapsed, said partitions assuming positions at right angles to their collapsed relation when the body member is distended, the partitions and the body walls being provided with complementary slots and configured to inter-engage with one another in such a way as to hold the body walls when distended against internal and external displacement, substantially as described.

4. An egg box having a body with an upstanding slotted portion, partitions extending through said slots, and thereby adapted to swing into folded position against the sides of said upstanding portion or to extend at right angles thereto, said body portion having extensions to fold up around the edges of the partitions with means for holding the said extensions inclosing said partitions, said partitions when folded lying between the extensions and the upstanding portions, the extensions and the partitions being adapted to inter-engage with one another when the box body is distended to prevent internal and external displacement of the body walls, substantially as described.

5. An egg box comprising a collapsible body member, partitions carried thereby and foldable in relation to the body member, said body member having extensions to inclose said partitions when they are in unfolded positions, said extensions extending upon opposite sides of the longitudinal center of the box in the form of adjacent troughs connected at their inner upper edges and having downwardly converging side walls so spaced that eggs contact therewith and are by such contact suspended above the bottom plane of the box, said extensions being slotted and the bases of the partitions extending through the slots and lying in part within and opposite unslotted parts of the side walls whereby to prevent collapse by lateral pressure, the rests formed by the bases of the partitions lying in part outside of unslotted parts of the side walls of the trough to support the same and form rests and protectors for the body, substantially as described.

6. An egg box comprising a body member having an upstanding center portion, partitions mounted thereon to fold against the faces thereof or to extend at right angles thereto, said body having extensions at each side creased to fold intermediate of their width at points distant from the base of the center portion about equal to the height of said center portion and adapted to fold over said center portion when the partitions are folded, the terminal portions of said extensions beyond the creases being no wider than the height of the center portion, whereby the box when in folded form will present a strip-like formation of a width substantially that of the height of the center portion, substantially as described.

7. An egg box comprising a slotted blank and walls inserted in said slot each provided with end notches, said walls being adapted to lie flat one on the other longitudinally of the blank when the same is folded and to be erected transversely of the blank by the opening out of the same, the said blank when opened out forming sides adapted to be seated in the said wall notches so as to form with the said walls egg-carrying compartments, and the notches serving to prevent internal and external displacement of the sides of the blank.

8. An egg box comprising a slotted blank and walls inserted in said slots each provided with end notches and an upper edge slot, said walls being adapted to lie flat one on the other longitudinally of the blank when the same is folded and to be erected transversely of the blank by the opening out of the same, the said blank when opened out forming sides adapted to be first seated in the said end notches so as to form with the walls egg-carrying compartments and then folded so that its ends may be engaged in the upper edge slots whereby covers for the said compartments are formed.

9. An egg box comprising a slotted blank and walls inserted in said slots each provided with end notches and a pair of inclined upper edge slots, said walls being adapted to lie flat one on the other longitudinally of the blank when the same is folded and to be erected transversely of the blank by the opening out of the same, the said blank when opened out forming sides adapted to be first seated in the said end notches so as to form with the walls egg-carrying compartments and then folded so that its ends may be engaged in the inclined upper edge slots whereby covers provided with a cushioning edge for the eggs are formed.

JOSEPH LEOPOLD COYLE.